Aug. 9, 1966 K. WIEHL ETAL 3,265,959

HALL-VOLTAGE GENERATOR WITH MEANS FOR SUPPRESSING
THERMOELECTRIC ERROR VOLTAGES
Filed March 13, 1963

United States Patent Office 3,265,959
Patented August 9, 1966

3,265,959
HALL-VOLTAGE GENERATOR WITH MEANS FOR SUPPRESSING THERMOELECTRIC ERROR VOLTAGES

Klemens Wiehl, Friedrich Kuhrt, and Hans-Joachim Lippman, Nurnberg, Germany, assignors to Siemens-Schuckertwerke Aktiengesellschaft, Berlin-Siemensstadt and Erlangen, Germany, a corporation of Germany Filed Mar. 13, 1963, Ser. No. 264,804
Claims priority, application Germany, May 8, 1962, S 79,336
7 Claims. (Cl. 323—94)

Our invention relates to Hall-voltage generating devices. Such devices possess a Hall plate, preferably a semiconductor wafer or layer of rectangular shape which, during operation, is traversed longitudinally by a control current while being subjected to a magnetic field perpendicular to the plane of the plate. The output voltage is taken from across Hall electrodes which constitute respective probes on the longitudinal sides of the rectangular wafer, usually located midway between the short sides at which the current supply terminals are located. The Hall voltage output of such a device is supposed to be determined only upon the magnitude of the control current flowing through the Hall plate and the magnitude of the magnetic field acting upon the plate.

However, when such Hall voltage generators are used under greatly varying ambient temperature conditions or at locations of a high temperature gradient, the resulting thermoelectric forces cause an error voltage to occur between the points where the semiconductor material of the Hall plate is joined with the control-current supply leads. Such error voltages falsify the output voltage and thus affect the measuring, controlling, regulating or signalling purpose to be served.

It is an object of our invention to provide a Hall-voltage generating device in which thermoelectric error voltages are eliminated or reduced to a negligible magnitude by economically applicable means that are simple in design and application.

To this end, and in accordance with the feature of our invention, the magnetizable core structure that constitutes the magnetic circuit of the Hall-voltage generator is placed upon a base plate of good heat conducting material, a thermally insulating sheet or layer being interposed. The base plate is preferably of large dimensions and mass in comparison with the dimensions and mass of the Hall plate and has preferably a heat-storage capacity about as large or preferably larger than that of the magnetic circuit. A suitable material for such a base plate is copper, for example. The intermediate thin layer of heat insulating material is preferably made of mica, although other insulating materials are also applicable.

By virtue of the resulting thermal relation between the Hall-voltage generator proper and the adjacent heat conductive base plate, the effect of ambient temperature variations or temperature gradients upon the junction points between the current supply leads and the Hall plate are minimized to such an extent that the thermoforces are correspondingly reduced, thus minimizing the occurrence of error voltages.

In cases where the operating conditions are such that the provision of the above-mentioned base plate does not eliminate thermal disturbance, it is preferable, according to another feature of our invention, to electrically connect the control-current terminals of the Hall plate with respective strips consisting of the same semiconductor material as the Hall plate, and to place the ends of the strips close to each other and connect them to the current supply leads consisting, for example, of copper. As a result, the solder junctions apt to produce a thermoelectric error voltage if subjected to respectively different temperatures, are so closely spaced from each other that they are both virtually at one and the same temperature regardless of temperature changes.

According to another feature of our invention, the industrial series production of Hall generators according to the invention is facilitated by forming the semiconductor plate or wafer together with the above-mentioned current supply strips from a single coherent plate or wafer, for example, by etching.

The foregoing and more specific objects, advantages and features of our invention, said features being set forth with particularity in the claims annexed hereto, will be apparent from the following in conjunction with the embodiments of the invention illustrated by way of example in the accompanying drawing, in which:

Figure 1:
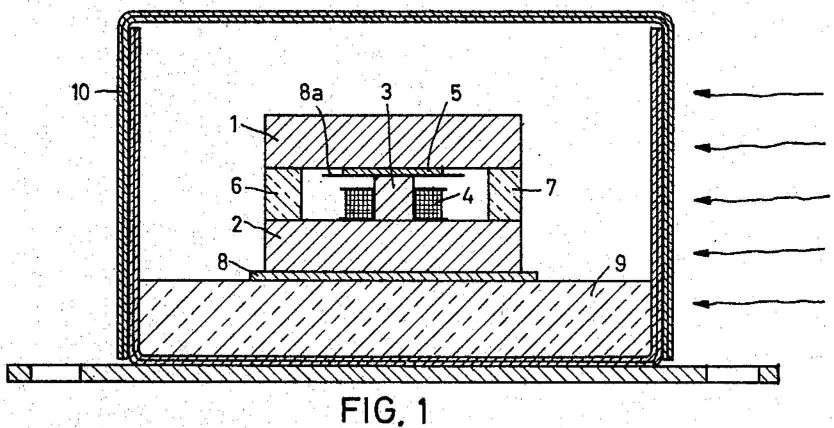
FIG. 1 is a sectional view of an embodiment of a modulator of the Hall-voltage generating type of the present invention.
Figure 2:
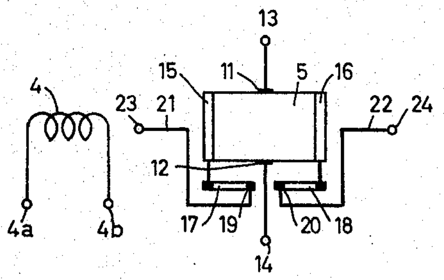
FIG. 2 is a schematic top view and a circuit diagram of the Hall-voltage generating components which may be utilized in the modulator of FIG. 1.

The modulator according to FIGS. 1 and 2 comprises two ferrite plates 1 and 2 which, together with a ferrite bridge member 3, constitute a core structure of the type more fully described in our copending application, Serial No. 264,978, now Patent No. 3,226,657, filled concurrently with the present application and assigned to the assignee of the present invention. The bridge member 3 is provided with a modulator winding 4 which energizes the core structure in accordance with the modulating frequency. A Hall plate 5 of semiconductor material such as indium antimonide is located between the bridge member 3 and the ferrite plate 1. The outer ends of the ferrite plates 1 and 2 are joined at both sides by non-magnetic members 6 and 7.

The Hall plate 5, which may consist of a thin layer deposited upon the bottom surface of the core plate 1 and which may have a thickness of 3 to 5 microns, is generally of rectangular shape and is provided with current terminals 15 and 16 along its short sides (FIG. 2). Two Hall electrodes 11 and 12 form respective probes on the two long sides of the rectangle midway between the terminals 15 and 16. The Hall electrodes are connected to respective output terminals 13 and 14. During operation of the device, the coil 4 is energized at its terminals 4*a* and 4*b* by the modulating signal. The carrier, such as a direct current or low-frequency alternating current, is applied across the terminals 15 and 16 of the Hall plate 5. The modulated ouptut voltage is available between the terminals 13 and 14. The modulator may also be operated by applying a carrier frequency to the coil 4 and a modulating signal to the Hall-plate terminals 15 and 16.

The magnetic circuit constituted by the core structure is placed upon the top surface of a relatively thick copper plate 9, a mica sheet 8 being interposed between core and copper plate.

For shielding the semiconductor Hall plate 5 from heat that may radiate from the field winding 4, another mica sheet 8*a* is inserted between the Hall plate 5 and the winding 4. The sheet 8*a* surrounds the ferrite bridge member 3. For suppressing the effect of extraneous magnetic fields, the modulator is provided with a double-walled housing 10 of magnetizable material.

When employing a modulator of this type, the occurrence of unilateral heating from the outside is sometimes inevitable, this being indicated by wavy arrows in FIG. 1. Such heating may cause temperature differences between the two short sides of the Hall plate, resulting in thermoelectric error voltages. However, by virtue of its high thermal conductivity and heat capacity, the base plate 9 equalizes to a great extent any such tendency of temperature differences between the respective sides of the modulator Hall plate. In addition, the insulating layer 8 provides for thermal shielding of the ferromagnetic circuit relative to the copper plate 9.

However, in cases where particularly exacting requirements are to be met, the compensation of thermoforces can be further improved by designing the current-electrode connections of the Hall-voltage generator in the manner illustrated in FIG. 2. The current electrodes 15 and 16 of the Hall plate are connected with the appertaining external terminals 23 and 24 through respective strips 17 and 18 which consist of the same semiconductor material as the Hall plate 5, for instance of indium antimonide. The ends 19 and 20 of the two strips are placed close to each other and are connected to respective current supply leads 21 and 22 of copper. As a result, the solder joints that may give cause to thermo-voltages in the event of temperature differences are so close to each other, namely at the ends 19 and 20, that, from a thermal consideration, they are virtually located at one and the same spot in thermal respects. Consequently, if changes in temperature occur, they are simultaneously effective are both junction points so that the occurrence of thermoelectric voltage is also suppressed. This contributes to reducing the susceptibility of the device to the effect of temperature, in conjunction with the thermal equalization afforded by the aforedescribed heat conducting base plate 9 and the thermal shielding means.

Figure 3:
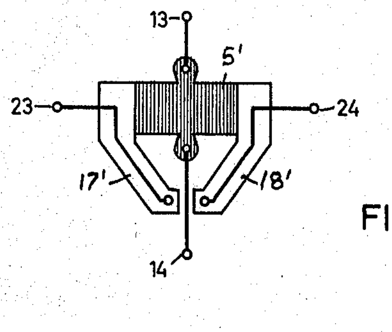
FIG. 3 is a plan view of a modification of the Hall plate of FIG. 2.

The Hall plate shown in FIG. 3 functions thermoelectrically in the same manner as the one described above with reference to FIG. 2, but has the advantage of a greatly simplified production method. The Hall plate 5′ proper and the semiconductor strips 17′ and 18′ of the same semiconductor material are formed from one coherent semiconductor wafer or layer. This is preferably done by first depositing the layer so that it covers the over-all area of the entire semiconductor structure, and thereafter etching away from the deposited material certain portions and smaller areas to arrive at the ultimate shape shown in FIG. 3. Such etching is facilitated by properly masking the deposited semiconductor layer, for example with masking varnish. The layer or wafer may have a thickness of approximately 20 microns, and the active portion of the Hall plate 5′, which is shown vertically hatched in FIG. 3, can be etched down to a layer thickness of about 3 to 5 microns.

It has been found that the invention affords reducing thermoelectrically produced zero-point errors of Hall-voltage generators down to a virtually negligible value even under extreme operating condition.

To those skilled in the art, it will be obvious upon a study of this disclosure that our invention is amenable to modification in various respects and can be given embodiments other than particularly illustrated and described herein, without departing from the essential features of the invention and within the scope of the claims annexed hereto.

We claim:

1. In a Hall-voltage generating device having a Hall plate and a magnetic circuit structure with a field gap in which the Hall plate is located, the combination of means for suppressing Hall-voltage zero errors due to thermoforces comprising a thermally good conducting base plate, said magnetic circuit structure being mounted on said base plate, and a thermally insulating layer interposed between said base plate and said structure.

2. In a Hall-voltage generating device having a Hall plate and a magnetic circuit structure with a field gap in which the Hall plate is located, the combination of means for suppressing Hall-voltage zero errors due to thermoforces comprising a base plate of copper, said magnetic circuit structure being mounted on said base plate, and a thermally insulating layer of mica between said base plate and said structure.

3. In a Hall-voltage generating device having a Hall plate and a magnetic circuit structure with a field gap in which the Hall plate is located and a field winding on staid structure, the combination of means for suppressing Hall-voltage zero errors due to thermoforces comprising a thermally good conducting base plate, said magnetic circuit structure being mounted on said base plate, a thermally insulating layer interposed between said base plate and said structure, and a thermally insulating sheet member disposed between said coil and said Hall plate for insulating said Hall plate from heat generated by said coil.

4. In a Hall-voltage generating device according to claim 3, said magnetic circuit structure having an H-shaped cross section and having said coil and said Hall plate coaxially located in the middle portion of the H-shape, said insulating sheet member being coaxially interposed on said middle portion.

5. In a Hall-voltage generating device according to claim 4, said sheet member and said insulating layer consisting of mica, and said base plate consisting substantially of copper.

6. In a Hall-voltage generating device having a Hall plate and a magnetic circuit structure with a field gap in which the Hall plate is located, the combination of means for suppressing Hall-voltage zero errors due to thermoforces comprising a thermally good conducting base plate, said magnetic circuit structure being mounted on said base plate, and a thermally insulating layer interposed between said base plate and said structure, said Hall plate having two control-current terminals and two Hall-voltage electrodes, two current conductors electrically connected to said respective terminals and consisting of respective strips formed of the same material as said Hall plate, said two conductor strips extending toward each other and having respective ends in proximity to each other, and control-current leads connected to said respective strip ends.

7. In a Hall-voltage generating device according to claim 6, said Hall plate and said two strips forming jointly a single coherent semiconductor wafer.

References Cited by the Examiner

UNITED STATES PATENTS

| | | | |
|---|---|---|---|
| 2,558,563 | 6/1951 | Janssen | 338—32 |
| 2,725,504 | 11/1955 | Dunlap | 323—94 |
| 3,042,887 | 7/1962 | Kuhrt et al. | 338—32 |

JOHN F. COUCH, *Primary Examiner.*

LLOYD McCOLLUM, *Examiner.*

A. D. PELLINEN, *Assistant Examiner.*